United States Patent [19]

Rotter et al.

[11] Patent Number: 5,536,793
[45] Date of Patent: Jul. 16, 1996

[54] CONCENTRATE FOR USE IN THE MELT FABRICATION OF POLYESTER

[75] Inventors: George E. Rotter, Clarendon Hills; Weilong Chiang, Naperville; Boh C. Tsai, Inverness; John L. Melquist, Naperville; Cheryl A. Pauer, Aurora; Stephen Y. Chen, Wheaton, all of Ill.

[73] Assignee: Amoco Corporation, Chicago, Ill.

[21] Appl. No.: 475,325

[22] Filed: Jun. 7, 1995

Related U.S. Application Data

[60] Continuation-in-part of Ser. No. 241,483, May 12, 1994, Pat. No. 5,446,111, which is a division of Ser. No. 10,767, Jan. 29, 1993, Pat. No. 5,288,764.

[51] Int. Cl.⁶ .................................................. C08F 20/00
[52] U.S. Cl. ......................... 525/437; 525/437; 525/444; 524/174; 524/176
[58] Field of Search ................................. 525/437, 444; 524/174, 176

[56] References Cited

U.S. PATENT DOCUMENTS

| | | | |
|---|---|---|---|
| 3,553,157 | 1/1971 | Dijkstra et al. | 523/444 |
| 4,132,707 | 1/1979 | Rotter et al. | 528/273 |
| 4,145,466 | 3/1979 | Leslie et al. | 428/35 |
| 4,176,101 | 11/1979 | Leslie et al. | 260/22 T |
| 4,933,429 | 6/1990 | McCracken et al. | 528/272 |
| 4,981,631 | 1/1991 | Cheung et al. | 264/50 |
| 5,000,991 | 3/1991 | Hayashi et al. | 428/36.5 |
| 5,128,383 | 7/1992 | Amano et al. | 521/182 |
| 5,134,028 | 7/1992 | Hayashi et al. | 428/332 |
| 5,229,432 | 7/1993 | Muschiatti et al. | 521/182 |
| 5,288,764 | 2/1994 | Rotter et al. | 521/81 |
| 5,340,846 | 8/1994 | Rotter et al. | 521/182 |
| 5,362,763 | 11/1994 | Al Ghatta et al. | 521/79 |
| 5,391,582 | 2/1995 | Muschiatti et al. | 521/81 |
| 5,422,381 | 6/1995 | Al Ghatta et al. | 521/182 |
| 5,446,111 | 8/1995 | Rotter et al. | 525/444 |

FOREIGN PATENT DOCUMENTS

| | | |
|---|---|---|
| 0437094 | 12/1990 | European Pat. Off. . |
| 0442759 | 2/1991 | European Pat. Off. . |
| 0422282 | 4/1991 | European Pat. Off. . |
| 59-210955 | 11/1984 | Japan . |
| 9010667 | 9/1990 | WIPO . |

OTHER PUBLICATIONS

Abstract for JP 95033053.

*Primary Examiner*—Samuel A. Acquah
*Attorney, Agent, or Firm*—Scott P. McDonald; Stephen L. Hensley

[57] ABSTRACT

Concentrates produced by melt processing a branching agent and a polyester carrier are disclosed. The concentrates are useful in melt processing polyesters. The concentrates contain sufficiently high concentrations of a branching agent to minimize the formation of crosslinked compounds in the concentrates. Process for using the concentrate also are disclosed.

21 Claims, 2 Drawing Sheets

CONCENTRATE FOR USE IN THE MELT FABRICATION OF POLYESTER

This application is a continuation-in-part of allowed U.S. application Ser. No. 08/241,483, filed May 12, 1994, now U.S. Pat. No. 5,446,111, which is a divisional application of Ser. No. 010,767, filed Jan. 29, 1993, now U.S. Pat. No. 5,288,764, issued on Feb. 22, 1994. The disclosures of the foregoing application and patent are hereby incorporated by reference.

FIELD OF THE INVENTION

The present invention relates generally to polyester extrusion in which polyester melt strength is enhanced by reacting the polyester with a polyfunctional branching compound. More particularly, the invention concerns a resin concentrate obtained by melt processing a polyester and sufficiently high concentrations of a branching agent to minimize the formation of crosslinked compounds in the concentrate. Compared with processes in which a polyester to be foamed is combined directly with neat branching compound and then foamed, we have discovered that the premixed concentrate of the present invention can substantially improve the stability of the polyester foam extrusion process and reduce the amount of unreacted branching agent present in articles fabricated from the polyester foam. Use of the concentrate of the invention reduces viscosity of the polyester extrusion mass near the loading end of the extruder, while achieving desired melt strength enhancement toward the end of the extrusion line. Hence, use of the concentrate substantially enhances throughput in foam and non-foam polyester melt fabrication processes.

BACKGROUND OF THE INVENTION

Articles prepared from foamed polymers offer several significant advantages over those made from unexpanded materials. For example, the insulation value per unit thickness of a foamed sheet is greater than that of a sheet of unfoamed polymer. Also, the strength-to-weight ratio of foamed materials is higher than unfoamed materials. These attributes have been applied to greatest advantage in the building trades where foamed polymer sheets are used as building insulation, and in the packaging area where foamed materials are used to fabricate lightweight trays and other food service products. Although polystyrene foam articles are the norm for applications which have less demanding thermal or mechanical requirements, there is a growing desire to successfully commercialize foamed articles obtained from other resins such as crystalline or semicrystalline polyesters, primarily polyethylene terephthalate, ("PET"). Based on its resin properties, PET can be expected to provide better mechanical and thermal performance than polystyrene foam and better chemical and flame resistance. However, there are a number of well documented problems associated with the extrusion of polyester foam. In particular, we have observed instability and poor density reductions in polyester foam processes described heretofore. For example, Cheung et al., U.S. Pat. No. 4,981,631 discloses foamed articles such as dual ovenable trays obtained from PET that contain 1 to about 6 wt. % of a polyolefin (i.e. polypropylene or polyethylene). Unfortunately, the maximum obtainable density reductions (about 50%) are generally considered unsatisfactory for many applications. We have also discovered that when a branching agent is used to improve the processing of the polyester, relatively high levels of the unreacted branching agent, for example pyromellitic dianhydride, remain in the finished article, which may be objectionable in the context of potential food uses or in the context of the long term stability of structural foam products sold into the housing market.

By way of background, the foaming 6 of a resin via extrusion typically involves the steps of melting the polymer in the extruder, adding a foaming agent to the molten resin, then cooling the mixture in the forward sections of the extruder and forcing it through a die. Often this process is carried out in a pair of single screw extruders connected in tandem. The use of a twin screw extruder for the process is also well known. The foaming agent, usually a gas or a low boiling compound, is mixed with the molten resin in the extruder under sufficiently high pressure to maintain the resin/blowing agent mixture as a single phase within the extruder. Foaming occurs when this pressurized mixture exits the die, travelling from the region of higher pressure within the extruder, to a region of lower (usually atmospheric) pressure outside the extruder. The reduction in pressure causes the blowing agent to expand and form bubbles, thereby imparting a foamed quality to the extruded resin.

Substantial difficulties encountered in the extrusion of crystalline or semi-crystalline polyester foams (as distinguished from polystyrene foam) are caused primarily by: (1) a narrow "operating range" and (2) poor melt strength. The term "operating range" is recognized in the art as the optimum temperature for extruding the resin to produce a stable foam. At temperatures below the operating range, the molten polymer will either be too viscous to process, or if processable, too viscous to support foam cell growth, which means that any extrudate will have little if any foam character. At temperatures above the operating range the viscosity of the extrusion mass is low enough to permit expansion of the blowing agent gas, but too low to prevent the foam bubbles from collapsing, which also produces a poorly foamed, dense product. Ideally, the polymer to be foamed should have a very wide operating range. For example, in the case of polystyrene the difference between the highest and lowest temperature at which the resin can be successfully foamed is about fifty degrees centigrade. Generally speaking, the more slowly a polymer changes viscosity in response to a constant temperature gradient, the larger will be its operating range. In general, amorphous resins (e.g., polystyrene) have very large operating ranges because they typically elicit a gradual change in viscosity with temperature. On the other hand, semi-crystalline polymers such as poly(ethylene terephthalate) ("PET") exhibit a relatively abrupt transition from a low viscosity material above the crystalline melting temperature to a high viscosity polymer below the melting temperature. This permits a very narrow temperature region in which the polyester can be foamed. In the case of PET, the narrow operating range means that unless the extrusion melt temperature is very closely controlled, the foam will either form too easily upon extrusion of the resin from the die (and collapse on itself), or not form at all. The additional process cost associated with maintaining the extrusion conditions within PET's operating range is seen to be impractical.

Even if measures can be taken to maintain the extrusion process temperatures within PET's narrow operating range, a second problem noted above, the poor melt strength of the resin, impairs the ability of PET to support the growth of bubbles upon extrusion of the resin from the die. A number of patents disclose melt strength improvement of PET by reacting PET with a branching component. However, most of these patents do not discuss improvements in PET melt strength in the context of a foaming process. For example, Leslie et al. U.S. Pat. No. 4,145,466 discloses adding a polyanhydride (e.g. PMDA) to the PET in an amount from 0.1 to 5 wt. % based on the weight of the PET, preferably 0.2 to 1.5 %, and most preferably 0.3 to 1.0 wt. %, to enhance blow molding and injection molding of PET. The manner in which the PMDA is added to the PET is described at column 3 lines 7–12, and Example 1 of the Leslie et al patent where it is stated that the PMDA and the PET are melt-mixed in an extruder. Although the patentee alludes to the manufacture of foams at column 3 line 38, no teachings of any foaming processes are given in the patent.

Another patent addressing the problem of PET's poor melt viscosity characteristics is Dijkstra et al U.S. Pat. No. 3,553,157. Example 4 and FIG. 1 of Dijkstra et al disclose mixing PMDA and PET where the amount of PMDA ranges from 0.5 to 1.0 wt % PMDA based on the weight of the PET. According to FIG. 1 of Dijkstra et al., the patentees' findings are that a maximum improvement in intrinsic viscosity is achieved at levels of PMDA of about 0.7 wt % based on the weight of polyester. Dijkstra et al. disclose that introduction of the polyfunctional compound (e.g. PMDA) can be achieved by masterbatching in which a mixture is prepared containing PET and the polyfunctional compound such that the mixture is very rich in polyfunctional compound. However, the patent does not state whether the masterbatch is prepared via extrusion or by simply dry mixing the PET and the polyfunctional compound. Dijkstra et al. patent does not deal with foam production.

A further patent dealing with melt strength improvement of PET is McCracken U.S. Pat. No. 4,933,429. Like the patents discussed above, McCracken does not discuss foam extrusion. The patentee discloses reaction of PET with about 0.05 to about 3.0 wt. % of a polyepoxide compound. In order to reduce exposure to patentee's preferred polyepoxide (triglycidyl isocyanurate, or "TGIC"), patentee states that it is preferred to initially prepare a concentrate by blending a relatively large amount of the TGIC with the polyester, where the amount of the TGIC in the polyester is in the range of about 3–20 wt % based on the weight of the concentrate. The concentrate is then blended with polyester to obtain a desired final level of TGIC in the polyester.

Turning now to patents which discuss polyester foam production, unexamined published Japanese patent application No. 59-210955 (1984), having a publication date of Nov. 19, 1984, discloses a method for manufacture of a thermoplastic polyester resin foam in which polyester resin (including PET) is mixed with 0.01 to 2 mole % (based on the PET) of a multifunctional carboxylic acid anhydride (including pyromellitic dianhydride "PMDA") and 0.03 to 2.5 wt. % of a multifunctional glycidyl ester. Although the method disclosed in the Japanese patent application concerns use of a PET resin composition containing (1) a multifunctional carboxylic acid anhydride and (2) a multifunctional glycidyl ester, FIG. 2 of the published Japanese application discloses the improvement in melt viscosity obtained when PET is combined with PMDA in the absence of the glycidyl ester.

Further patents dealing with polyester foam production are Hayashi et al. U.S. Pat. Nos. 5,000,991 and 5,134,028 which disclose a process for producing a thermoplastic polyester resin foam. The process of Hayashi et al. comprises melting a thermoplastic polyester resin (e.g. PET), mixing the molten resin with a blowing agent and extruding the mixture into a low pressure zone to carry out foaming. The process is characterized in that a compound having two or more acid anhydride groups per molecule (e.g. PMDA) is added to the thermoplastic polyester resin. Hayashi et al. '991 disclose using an amount of PMDA in the range of from about 0.05 to 5.0 parts by weight per hundred parts by weight of the thermoplastic polyester resin. The patentees teach at column 5, lines 10 to 13, that "when the amount [of PMDA] exceeds 5.0 parts by weight, the gelation of the molten material of the thermopolastic polyester proceeds and extrusion foaming cannot be effected". Hayashi et al. '991 state at column 6, lines 36 to 61, that the thermoplastic polyester resin can be mixed with the compound having two or more acid anhydride groups (i.e. PMDA) in any of three possible methods: First, by mixing (without melting) the polyester resin pellets with PMDA powder to coat the pellets with PMDA; or, secondly, by pre melt-mixing the PMDA with a thermoplastic resin (which can be the same or different from the polyester), pelletizing the mixture, and adding the pelletized mixture to the polyester; or, thirdly, by melting the polyester in the extruder and then adding the PMDA to the extruder to effect mixing. The patentees equate these methods and do not suggest or teach any different outcome in the foaming process if one mode of combining the PET and PMDA is chosen over another. Hayashi et al. '991 also disclose the addition of a compound of a metal of Groups I, II or III elements of the periodic Table (e.g. sodium carbonate) to the polyester resin in an amount of 0.05 to 5 parts by weight per hundred parts of polyester resin. The patentee states that the metal compound results in foams having higher tensile elongation and finer cells. Hayashi et al. '991 teach against using levels of sodium compounds in the process below about 220 ppm.

Notwithstanding the disclosure of Hayashi et al., we have observed instability in the process for extruding a low density polyester foam wherein PET, PMDA, (and optionally sodium carbonate) and a foaming nucleator, such as talc, are fed into either a twin screw extruder or a ¾" single screw extruder. In particular, we observed large variations in product quality during runs of more than an hour. Instability of the process was indicated by the fact that the extruder torque and pressure were observed to double or halve without any change in process settings. The inherent viscosity of samples exhibited similar wide fluctuations. These factors resulted in PET foams with large density and microstructure inconsistencies. Moreover, we were unable to attribute these inconsistencies to feed variations, moisture effects or equipment variations. In addition we have determined that the process of Hayashi et al. '991 results in amounts of unreacted PMDA which it is desired to reduce.

A further problem in the extrusion foaming of polyester foam is the difficulty in using recycled PET as a feedstock for such foaming. Generally, the inherent viscosity of recycled PET is lower than virgin PET due to processing performed by recycling processors to remove impurities. A problem encountered in attempting to use recycled PET is that there are wide differences in the extent to which different lots or sources of PET recycle can be improved in melt viscosity via chain branching reaction with PMDA. Some lots of recycled PET exhibit very good improvement in melt viscosity when reacted with a chain branching agent such as PMDA, while others do not. We have sought to overcome this problem so that a manufacturer of foamed PET articles can consistently and reliably employ PET from all possible sources, including recycle.

Still another problem to overcome in PET melt processing is that extruder throughputs, while generally satisfactory, should be higher in order to render such processes more economical. The branching reaction between PMDA and PET, while improving the processability of PET, has a tendency to cause increases in the extruder torque near the beginning of the extrusion line which can hamper throughput. For example, when PET is extruded with PMDA to obtain a melt strength enhanced resin, a subsequent remelting of this already extruded material to melt fabricate articles typically encounters high viscosities at the beginning of the extrusion line, hence reducing throughput. It is desired to minimize this problem as much as possible so that extruder throughput can be increased.

SUMMARY OF THE INVENTION

The ability of the present invention to achieve process stabilization using polyester concentrates in which levels of branching compound exceed about about 1 wt. % is surprising because polyester resin compositions containing about 1.0 wt. % of branching compound are difficult to process, and because the art (see e.g. Hayashi et al., '991 discussed above) has taught against using high levels of branching compound (i.e. greater than 5 wt. %) due to gel formation. Quite surprisingly, we have succeeded in using typical extrusion conditions to prepare pelletized concentrates which do not exhibit gels, notwithstanding concentrations of branching compound therein of greater than about 5 wt. %, and preferably about 8 to about 12 wt. %, based on the weight of the concentrate. Because gel formation can cause problems in polyester extrusion processes, it is particularly surprising that use of a concentrate containing relatively high levels of branching material would actually improve, rather than degrade, the stability of a polyester extrusion process.

In view of the properties and advantages of the branching agent concentrate used herein, one embodiment of the present invention is a composition for improving the processibility of polyester. The composition is produced by melt processing a mixture comprising at least 50 weight percent polyester resin and greater than 5 and no more than 20 weight percent of a polyfunctional branching compound.

The term "branching compound" or "branching agent" is used herein to describe polyfunctional compounds which react with polyesters to produce branching thereof.

Another embodiment of the invention is a concentrate useful for melt processing with a thermoplastic polyester, the concentrate being produced by melt processing a mixture comprising a polyester resin carrier and a polyfunctional branching compound. The branching compound includes at least 3 branching agent reactive sites per molecule. The polyester resin carrier includes highly reactive end groups, and the ratio of branching agent reactive sites to highly reactive endgroups in the mixture prior to melt processing is at least 6:1.

As used herein, the term "branching agent reactive sites" refers to all functional groups of a branching agent which ultimately are expected to react with polymer chains under melt processing conditions.

The term "highly reactive end groups" means those endgroups which are expected to readily react with branching agent under the melt processing conditions used to prepare the concentrate. The term and is explained in greater detail below.

In yet another embodiment of the invention, a concentrate useful for melt processing with a thermoplastic polyester comprises a polyester resin, a branching compound, less than one weight percent of crosslinked reaction products of the polyester resin carrier and the branching compound, less than 1000 parts per million of water, and optionally one or more polyester additives selected from the group consisting of nucleating agents, stabilizers, plasticizers, expansion nucleating agents, crystallization nucleating agents, pigments, fillers, flame retardants, rubber modifiers, colorants, antioxidants and antistatic agents.

As used herein, the term "crosslinked" refers to reaction products of a branching agent and polyester in which four or more polyester chains become attached through two or more branching agent molecules.

In still another embodiment of the invention, the concentrate of the invention can further be defined in terms of the torque requirements for melt processing the mixture used to produce the concentrate. In this embodiment, the concentrate is prepared by melt processing a mixture of a branching agent amount of at least five weight percent of the mixture and a polyester carrier amount of at least fifty weight percent of the mixture. The composition of the concentrate is characterized by a maximum melt-mixing torque no greater than ten percent of the highest maximum melt-mixing torque exhibited by melt processing mixtures containing greater polyester carrier amounts and lower branching agent amounts.

As used herein, the term "maximum melt-mixing torque" means the maximum mixing torque of a 72 gram sample of the polyester plus branching agent, after the sample has undergone mixing in a molten state, in a standard 60 cc Haake mixing bowl employing roller blades, at a mixing speed of 60 rpm, and a mixing temperature approximately at the midpoint of the operating range, which is the case of a PMDA/PET mixture is about 270° C., for a mixing period of at least 10 minutes. Under certain prescribed conditions, explained in greater detail below, the concentrates of the invention exhibit melt-mixing torques of less than about 1 Newton-meter.

Another embodiment of the invention is a process for producing and using a concentrate in the melt processing of a polyester. The process includes the steps of melt processing a mixture of at least 50 weight percent of a polyester resin carrier and between 5 and 20 weight percent of a polyfunctional branching compound to produce a solid concentrate containing less than 1 weight percent of crosslinked reaction products of the branching compound and the polyester resin carrier. The solid concentrate subsequently is melt processed with a polyester which can be the same as or different from the polyester resin carrier.

Polyester foam produced from a concentrate in accordance with the present invention, such as that obtained from PET, has many potential uses including those in food packaging and insulation markets. The foam's thermal and mechanical properties are superior to polystyrene, and can find applications in markets currently serviced by polystyrene foam, as well as those markets where polystyrene foam is not used due to its inferior properties (for example, microwaveable containers). PET foam may also be gaining wider public acceptance as a recyclable product, which could confer a marketing advantage. The PET foam produced in the present invention can be used in a wide variety of end-uses and may be laminated for some of these applications and/or coextruded for hot water pipe insulation or cable coating. Regardless of end-use, the process and product improvements afforded by the present invention confer a substantial economic advantage.

DETAILED DESCRIPTION OF THE INVENTION

Generally speaking, a context in which the present invention can be practiced is that of polyester foam extrusion wherein polyester is melted and pressurized in an extruder; a suitable blowing agent is introduced into the molten polyester; and the polyester is then extruded through a conventional die apparatus into a region of lower pressure and temperature whereupon the blowing agent expands to foam the polyester. The foam extrudate, upon cooling, can then be subjected to other conventional processing steps, such as thermoforming, to obtain finished articles. Another context in which the invention can be practiced is that melt-fabrication of non-foam polyester articles.

A central feature of the invention involves the manner in which a suitable branching compound can be added to the polyester in the extruder to achieve greater stability in a foaming process and to bring about a reduction in the amount of residual unreacted branching compound present in foamed articles. Instead of directly charging a neat branching compound into the foam extruder concurrently with the polyester to be foamed, as is done in the prior art, the process of the present invention adds the branching compound to the extrusion line in the form of a previously melt-extruded concentrate material incorporating a relatively high level of the branching compound.

In the case of foaming extrusion, the resin carrier used to compound the concentrate of the present invention is preferably a polyester, and can be the same or different from the polyester which will be foamed in the extruder. In the case of foaming PET, we have found that foam quality is poor when polyethylene resin or polypropylene resin is substituted for PET as the carrier resin of the concentrate. The concentrate typically comprises greater than about 5 wt. % of a branching compound capable of branching the polyester. A particularly preferred amount of branching compound in the concentrate is from about 8 wt. % to about 12 wt %. At concentrations of branching compound below about 2 wt %, the concentrate is difficult to process due to high viscosity. At concentrations above about 20 wt. %, the extrusion mass has a tendency to break rendering pelletization difficult. The concentrate of the invention is surprising in that it can be prepared using conventional pellet extrusion with no appreciable gel formation.

In a process for using the invention, a minor amount of concentrate, conveniently prepared in the form of extruded pellets, can be loaded along with a major amount of pellets or powder of virgin or recycle polyester feedstocks into the hopper of a conventional extruder, whereupon the total concentrate+polyester mixture is melted, intimately mixed and then extruded through a suitable die, such as a flat die, an annular die or a nozzle-type die. The relative amounts of pre-extruded concentrate that can be added to a foam extruder along with virgin or recycle polyester feedstocks are such that there is achieved a final branching agent concentration in the extrusion mass of from about 0.1 wt % to about 1 wt % based on the total weight of the extrusion mass. Although it is known in the art to incorporate this level of branching agent in a polyester intended for foaming, the art neither discloses nor suggests the substantial benefits in terms of foam properties and process stability which can be achieved when a branching agent is incorporated into the polyester in the form of the concentrate of the present invention.

In somewhat greater detail, the polyester resins suitable for use in the present invention include linear polyesters or polycondensates of an aromatic dicarboxylic acid component and a diol component. Examples of dicarboxylic acid components include terephthalic acid, isophthalic acid, naphthalenedicarboxylic acid, diphenyl ether carboxylic acid, diphenyl dicarboxylic acid, diphenyl sulfone dicarboxylic acid and diphenoxyethanedicarboxylic acid. Examples of diol components include ethylene glycol, trimethylene glycol, tetramethylene glycol, neopentyl glycol, hexamethylene glycol, cyclohexanedimethanol tricyclodecanedimethanol, 2,2-bis (4-b-hydroxy ethoxy phenyl) propane, 4,4-bis (b-hydroxy ethoxy) diphenyl sulfone, diethylene glycol and 1,4-butanediol.

Polyesters prepared from the above components are well known in the art, and can be prepared via the dicarboxylic acid, or suitable derivatives such as dimethylesters of the above acids. In many cases, polyesters suitable for use in the invention are available for purchase from a variety of suppliers. Examples of polyesters that can be employed in the present invention include polyethylene terephthalate, polybutylene terephthalate, polybutylene terephthalate elastomer, amorphous polyesters, polycyclohexane terephthalate, polyethylene naphthalate, polybutylene naphthalate and mixtures of the foregoing. Specific examples of commercially available polyester resins useful in the present invention are Goodyear PET resins 7207 and 9506 ("C-PET"), Teijin Limited PET resin TR8580, and Eastman Kodak PET resin 9902. It should be understood that the present invention contemplates the extrusion of recycle PET which may already contain low levels of branching agent. It should be further understood that the present invention contemplates the extrusion of PET which may already contain low levels of a crystallization aid such as lower melting temperature materials including polyolefins and liquid crystalline polymers.

The term "branching compound" or "branching agent" as used herein is intended to encompass polyfunctional compounds which react with polyesters to produce branching thereof. Particularly preferred in the present invention in view of their surprising ability to result in gel free concentrates are branching compounds having two or more acid anhydride groups per molecule. Pyromellitic dianhydride ("PMDA") is particularly preferred because it is a relatively inexpensive, commercially available material that reacts quickly with the polyester resin.

Promotion of reaction between the branching agent and the polyester can be obtained by adding to the foaming extruder directly, or as part of the concentrate of the invention, an organic or inorganic Group I, II, or III metal compound. As disclosed in Hayashi et al U.S. Pat. No. 5,000,991 such compounds when used at levels disclosed in the patent can be used to facilitate the reaction between the branching agent and PET and also to serve as a nucleating agent for bubble formation. Examples of inorganic compounds include potassium chloride, sodium chloride, sodium hydrogen carbonate, sodium carbonate, potassium carbonate, zinc carbonate, magnesium carbonate, calcium carbonate, aluminum carbonate, sodium oxide, potassium oxide, zinc oxide, magnesium oxide, calcium oxide, aluminum oxide and the hydroxides of these metals. Examples of the organic compounds include sodium stearate, potassium stearate, zinc stearate, magnesium stearate, calcium stearate, aluminum stearate, sodium montanate, calcium montanate, lithium acetate, sodium acetate, zinc acetate, magnesium acetate, calcium acetate, sodium caprylate, zinc caprylate, magnesium caprylate, calcium caprylate, aluminum caprylate, sodium myristate, zinc myristate, magnesium myristate, calcium myristate, aluminum myristate, calcium benzoate, potassium terephthalate, sodium terephthalate, sodium ethoxide and potassium phenoxide. The compounds of Group I or II metals of the Periodic Table, for example sodium carbonate, are preferred.

In addition to the optional Group I, II, or III metal compounds referred to above, other conventional additives may be added directly to the foam extruder, or incorporated in the concentrate of the invention to improve the physical properties of the thermoplastic polyester resin foams and molded articles thereof. Examples of such additives are stabilizers, plasticizers, expansion nucleating agents (to aid foaming), crystallization nucleating agents (to aid later thermoforming steps), pigments, fillers, flame retardants, rubber modifiers, colorants, antioxidants and antistatic agents. There is no intention to restrict the types of expansion or crystallization nucleating agents that can be used in the process of the invention. Generally speaking, the nucleating agent can be any material, or mixture of materials, in amounts effective to induce crystallization, or to enhance cell formation and cell structure. If desired, the nucleating agent can be another crystalline resin. For example, as disclosed in Cheung et al. U.S. Pat. No. 4,981,631, foamed articles such as dual ovenable trays are obtained from PET that contains 1 to about 6 wt. % of a polyolefin (i.e. polypropylene or polyethylene). In the present invention, talc and sodium carbonate are found to be excellent nucleants for foam cell formation resulting in foam of excellent qualities. A nucleating agent combination which produces excellent foam quality in the process of the present invention comprises up to about 5 wt. % talc and up to about 0.5 wt. % sodium carbonate, based on the total composition being foamed.

The optional additives referred to above, including the Group I, II and II metal compounds, can be added to the foam extrusion process by either (1) directly placing the additives into the foaming extruder as neat materials separate from the concentrate of the invention; (2) compounding the additives into resin concentrates separate from the resin concentrates of the invention, and then adding desired amounts of the concentrates to the foaming extruder; or (3) incorporating the additives directly into the concentrate of the invention so that a single concentrate may be used to add branching agent and any other desired additives to the foam extrusion line. The second and third options are particularly preferred as they reduce the amount of separate feeds that need to be metered into the foaming extruder. For example, concentrates which contain the required amounts of branching agent according to the present invention can be obtained by melt extruding PET resin, the branching agent, talc, and sodium carbonate. The relative amounts of the talc, branching agent and sodium carbonate in the concentrate can be readily adjusted so that any given amount of concentrate capable of supplying a desired level of branching compound to resin being foamed will also supply the correct weight percentages of the other optional additives present in the concentrate.

The upper limit of the total amount of additives that can be compounded in the concentrate of the invention is determined by the processability of the filled carrier resin. It has been found for example, that PET could be compounded with 20 wt % branching compound, 15 wt % talc, and 6 wt % $Na_2CO_3$, for a total of 41 wt % additives in PET. This high level of additives was difficult but possible to process. The lower limit of various other additives in the concentrate is a matter of choice dependent upon the final concentrations of such additives which are desired in the extrusion mixture.

With respect to preparing a concentrate of polyester and branching agent suitable for use in obtaining a foamed polyester according to the present invention, we have found it is critical that the concentrate comprise greater than about 2 wt % branching agent based on the weight of the concentrate. At levels of branching agent within the range of from about 0.5 wt % to less than about 2 wt %, melt preparation of the concentrate is difficult due to high viscosity in the melt system caused by reaction of the branching agent and the polyester. Such high viscosity can render extrusion of the concentrate difficult to such an extent that extrusion is commercially unattractive. Nevertheless, in order to obtain the above-mentioned advantages of the concentrate, it is critical that the concentrate of the invention be prepared via a melt processing process such as melt extrusion. The advantages of the invention are not obtained using a dry-mixed concentrate containing the same relative amounts of polyester and branching agent. Surprisingly, at levels of branching agent greater than about 2 wt. % of the concentrate, the melt processibility of the concentrate is excellent, thereby rendering extrusion pelletization of the concentrate far more economically feasible. Hence, it is critical in the present invention to employ levels of branching agent in the concentrate greater than about 2 weight percent based on the weight of the concentrate. From the standpoint of making the most economical usage of the concentrate, the branching agent concentration is preferably greater than about 5 wt. % of the concentrate. A particularly preferred amount of branching agent is about 8–12 wt %. This range effectively balances the benefits of using large amounts of branching agent in the concentrate, against the need to avoid handling and processing difficulties which can begin to arise at increasingly higher levels of branching agent.

Figure 1:
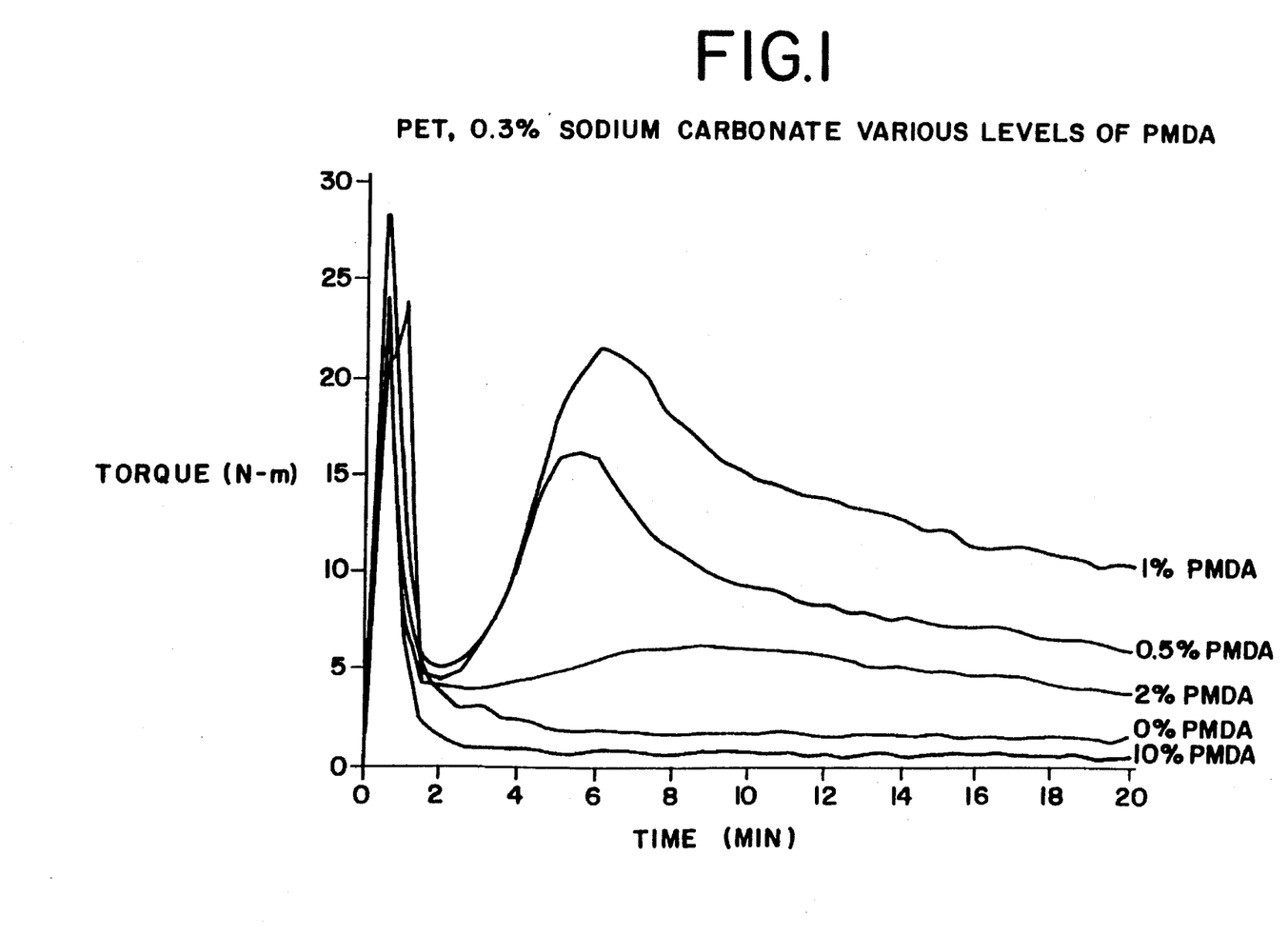
Figure 2:
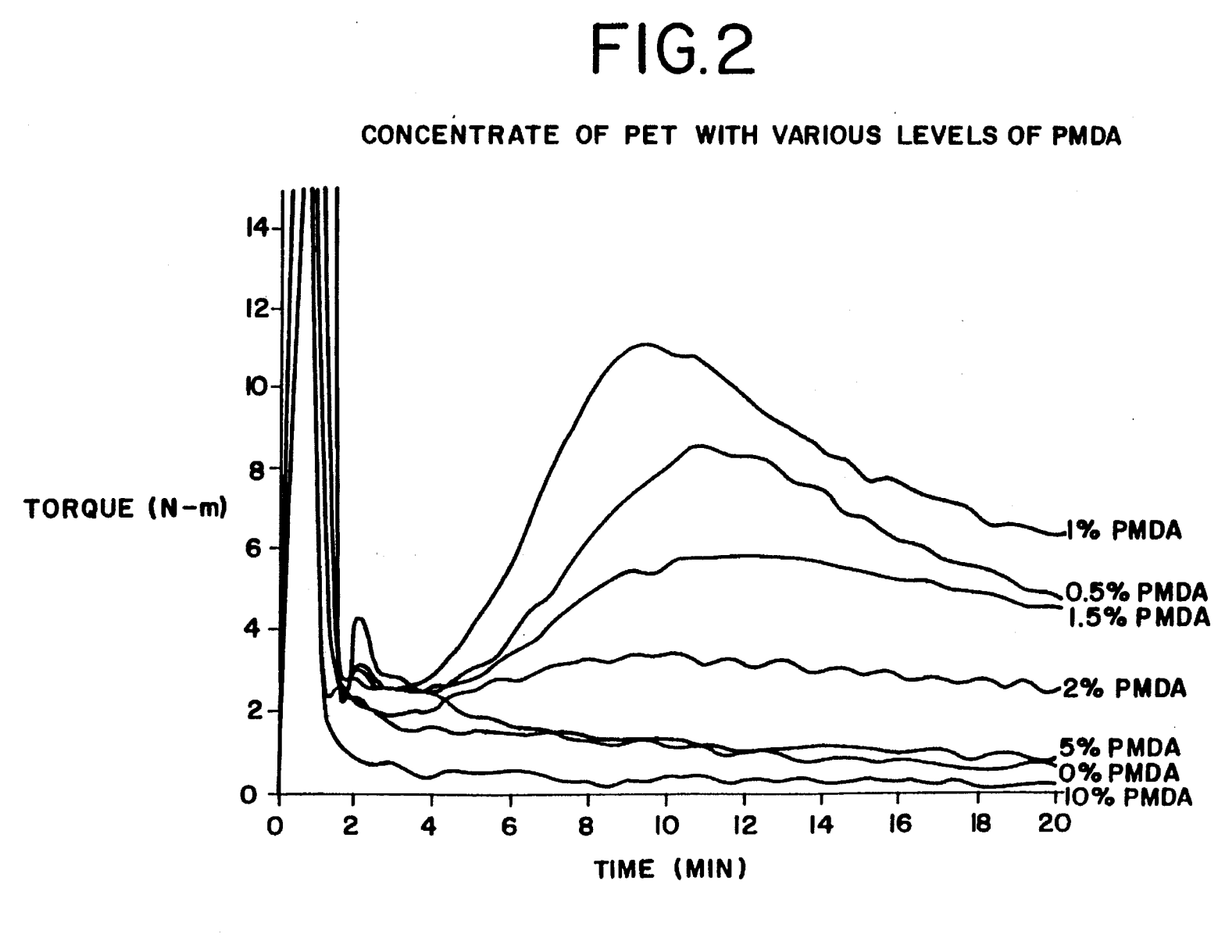

Reference may be had to FIGS. 1 and 2 which graphically depict the relationship between the maximum torque required to melt-mix the concentrate as a function of branching agent (PMDA) concentration. FIG. 1 (concentrate with sodium carbonate) and FIG. 2 (concentrate without sodium carbonate) illustrate the viscosity behavior of the molten concentrate at levels of branching agent (PMDA) above and below 2 wt %. The curves plotted in FIGS. 1 and 2 illustrate that high viscosities can be readily avoided in the melt processing of the concentrate by employing greater than about 2 wt % branching agent in the concentrate, with concentrations of greater than 5 wt %. branching agent yielding surprisingly low mixing torques of less than about 2 N-m. The viscosity behavior of the concentrate of the invention is particularly surprising given the teachings of Hayashi et al U.S. Pat. No. 5,000,991 in which the patentee states that levels of branching agent above 5% induce gelation. In fact, for the concentrate preparations reported in FIG. 2, no gelation was observed in concentrate samples containing greater than 2 wt. % PMDA. Although the concentrate samples of FIG. 1 were not analyzed for gel content, the viscosity curves set forth in FIG. 1 indicate that gelation was not effecting the processibility of these samples.

Given the low viscosities attainable in molten polyester/branching agent concentrate preparations comprising greater than about 2 wt % branching agent, a concentrate according to the invention can be defined as having a maximum melt-mixing torque of not greater than about 3 Newton-meters, preferably not greater than about 1 Newton-meters. As used herein, the term "maximum melt-mixing torque" shall be understood to mean maximum mixing torque of a 72 gram sample of the polyester plus branching compound, after the sample has undergone mixing in a molten state, in a standard 60 cc Haake mixing bowl employing roller blades, at a mixing speed of 60 rpm, and at a mixing temperature approximately at the midpoint of the operating range, which is the case of a PMDA/PET mixture is about 270° C., for a mixing period of at least about 10 minutes. The stated 10 minute mixing period should be understood as commencing at the point when the polyester plus branching compound, after being charged to the mixing bowl as a solid, has finished converting from a solid state to a molten state. Although there will be observed a brief spike in the viscosity curve (see curves in FIGS. 1 and 2) just prior to the 10 minute mixing period, this is attributable to the polymer plus branching material not yet being melted in the mixing bowl. It should be understood that the term "maximum melt-mixing torque" is not intended to refer to torque values observed prior to melting of the polymer plus branching compound. It should further be understood that the concentrate's melt mixing torque should be determined in the substantial absence of any catalytic materials (e.g., sodium carbonate) which may enhance the reaction of the branching compound and the polyester.

Concentrates melt processed in accordance with the present invention should be melt processed at temperatures sufficient to melt both the polyester and branching compound and with sufficient mixing to provide for homogeneity of the melt processed mixture. Typically, the mixture will be melt processed at temperatures between 200° and 310° C.

The surprisingly low mixing torques exhibited by the highly branching agent-loaded concentrates in FIGS. 1 and 2 is attributable to compositional differences in the melt processed concentrates. Relatively highly branching agent-loaded concentrates are believed to be compositionally different from lower loaded concentrates in that the more highly loaded concentrates are substantially free of crosslinked structures which are relatively insoluble in a polyester during subsequent melt processing steps. As used herein, the term "crosslinked" refers to reaction products of a branching agent and polyester in which four or more polyester chains become attached through two or more branching agent molecules. The compositional differences are best explained by comparing the following Examples A and B.

EXAMPLE A

In this Example, a PET resin contains the three moieties shown below as structures $P_1$, $P_2$ and $P_3$.

$P_1$ $P_2$

$P_3$ where Ⓟ denotes a PET polymer chain.

$P_1$, $P_2$ and $P_3$ comprise 90 weight percent of a PMDA/PET mixture to be melt processed into a concentrate. $P_1$, $P_2$ and $P_3$ are present in the mixture in weight percents of about 40, 40 and 10 weight percent, respectively, with the remaining 10 weight percent of the PMDA/PET mixture comprising substantially unreacted PMDA.

The PMDA/PET mixture is melt processed by extrusion to form concentrate pellets useful for melt processing with PET in subsequent melt processing operations.

During formation of the concentrate pellet, PMDA, $P_1$ and $P_2$ react to yield the structures shown below as $C_1$ and $C_2$.

$C_1$ $C_2$

As can be seen by comparing $P_1$ and $P_2$ to the structures of $C_1$ and $C_2$, PMDA reacts with PET hydroxyl endgroups to form compounds $C_1$ and $C_2$ which are relatively soluble in the concentrate.

$C_1$ and $C_2$ are highly stable in PET, and are easily melt processed into PET in a subsequent melt processing operation such as the process described in connection with FIGS. 1 and 2. It is believed that the weight percent of crosslinked structures in the foregoing concentrate is less than about 0.1 weight percent, and possibly less than 0.01 weight percent.

EXAMPLE B

In this Example, PET resin contains moieties $P_1$, $P_2$ and $P_3$ in the same ratio as in Example A. $P_1$–$P_3$ comprise 99 weight percent of the mixture to be melt processed into a concentrate, with PMDA comprising the remaining 1 weight percent of the mixture.

The melt processed concentrate contains relatively small amounts of moieties $C_1$ and $C_2$. The relatively low PMDA to hydroxyl endgroup ratio permits further reactions of PMDA with PET to occur, resulting in the production of crosslinked structures in which four or more PET polymer chains have reacted with two or more PMDA molecules. The structure of one such crosslinked molecule appears below as compound $X_1$.

$X_1$

Compounds similar to $X_1$ and their precursors in which multiple PET polymer chains are bound through multiple PMDA molecules are relatively insoluble in PET.

The presence of crosslinked compounds similar to $X_1$ and their precursors in melt-processed concentrate explains why the melt processed concentrates containing up to about 2 weight percent of PMDA exhibit the relatively high mixing torques shown in FIGS. 1 and 2. Conversely, where the PMDA concentration in the concentrate is greater than about 2 weight percent, the relative low ratio of hydroxyl end groups to PMDA molecules results in a concentrate in which highly PET-soluble, non-crosslinked compounds such as $C_1$ and $C_2$ are present in much higher amounts than $X_1$-like crosslinked, compounds. The relative absence of crosslinked compounds explains the relatively low mixing torques exhibited on FIGS. 1 and 2 for concentrates containing greater than about 5 weight percent PMDA.

More specifically, as illustrated in FIGS. 1 and 2, branching agent loadings in highly branching agent-loaded concentrates exhibit maximum mixing torques during preparation which are a factor of about 3 (at 2 weight percent PMDA) to 10 (at 5 weight percent PMDA) to as much as about 20 (at 10 weight percent PMDA) or more lower than the maximum mixing torque value obtained when melt processing a concentrate of PMDA and PET having about 1 weight percent PMDA loading.

The inventive concept illustrated by Examples A and B can be used to prepare other branching agent and polyester carrier concentrates useful in subsequent melt processing operations. The mixture of branching agent and polymer used to prepare such a concentrate should contain a stoichiometric excess of branching agent sufficient to limit the formation of crosslinked structures in the concentrate to a level below which substantial increases in mixing torque will occur during preparation of the concentrate. Branching agent to polymer ratios or concentrations useful in the preparation of polymer and branching agent concentrates may be determined in the following manner. Mixing torque data for melt processing preparation of concentrates containing various amounts of branching agent and polyester and any required additives are determined in accordance with the procedures used in connection with FIGS. 1 and 2. The total weight percent of polyester and bonding agent should be about equal in each case. From this data, the branching agent weight percent producing the highest maximum melt-mixing torque for a given amount of polyester is identified. Higher branching agent to polyester ratios or concentrations yielding lower maximum melt-mixing torques during concentrate preparation are then identified and beneficially used to prepare concentrates according to the present invention. The preferred concentrates will exhibit at least a factor of 2 reduction in mixing torque during preparation from the identified maximum mixing torque, although compositions characterized by greater reduction factors such as the 3, 10 and 20 reduction factors illustrated by the PET/PMDA data discussed above are preferred. Preferred concentrates consist essentially of polymer, branching agent, their noncrosslinked reaction products and any additives. A concentrate can be considered to consist essentially of the noncrosslinked reaction products of the polyester resin carrier, the branching agent any additives, and the noncrosslinked reaction products of the resin carrier, branching agent and additives when the mixing torque required to prepare the concentrate is at least a ten factor less than the maximum melt-mixing torque determined as explained above.

The concentrates in accordance with the present invention can also be characterized by the weight percent of crosslinked material present in the melt processed concentrate. Generally, the weight percent of crosslinked material in the concentrate should be less than about 1.0 weight percent, with less than 0.1 weight percent being preferred, and less than 0.01 weight percent being most preferred. The amount of crosslinked material may be characterized by dissolving the concentrate in boiling nitrobenzene and collecting and weighing any remaining insoluble material.

Yet another way to prepare the melt processed concentrates in accordance with the present invention is to specify the ratio of branching agent reactive sites to highly reactive polyester end groups. As used herein, the term "branching agent reactive sites" includes all functional groups of the branching agent which ultimately are expected to react with polymer chains under melt processing conditions. For example, a PMDA molecule contains four branching agent reactive sites. The term "highly reactive end groups" includes those endgroups which are expected to readily react with branching agent under the melt processing conditions used to prepare the concentrate. Typically, highly reactive endgroups are hydroxyl end groups. Conceivably, other highly reactive endgroups could be present, such as secondary amines found in polyesters or introduced into polyesters, either alone or in combination with hydroxyl endgroups. In such a case, those endgroups would be included when determining the number of highly reactive endgroups used in the branching agent functional site to highly reactive endgroup ratio. Where relatively non-reactive endgroups such as carboxylic acid endgroups are present in the polyester, these endgroups are not considered highly reactive endgroups for the purpose of determining the branching agent reactive site to highly reactive end group ratio.

Generally, it is preferred that the ratio of branching agent reactive units (e.g. moles of branching agent multiplied by the functionality of the branching agent) to highly reactive endgroups be at least 6:1, more preferably between 12:1 and 100:1, and most preferably between 20:1 and 50:1. In the case of concentrates containing PMDA and a PET such as Goodyear 7207 containing approximately the relative amounts of $P_1$, $P_2$ and $P_3$ specified in Example A, it is preferred that the ratio of branching agent reactive sites (e.g. moles of PMDA multiplied by 4) to free hydroxyl terminal groups be at least 6:1, more preferably between 12:1 and 100:1, and most preferably between 27:1 and 43:1, the latter range corresponding approximately to a concentrate prepared from a PET and about 8 to 12 weight percent of PMDA.

A process useful in practicing the invention comprises: (1) forming a molten mixture comprising (i) a major amount of a first resin composition comprising polyester and from 0 up to about 1 wt. % of a compound capable of branching the polyester, and (ii) a minor amount of the branching agent concentrate discussed above, wherein the relative amounts of (i) and (ii) are such that the molten mixture comprises from about 0.1 to about 1 wt. % of the branching compound; (2) adding a blowing agent to the molten mixture and (3) extruding the resultant mixture to obtain a foam. The polyester foam obtainable from this process represents density reductions of at least about 30%, preferably at least about 60%, and most preferably at least about 80%. Lower densities are preferred for building insulation, whereas higher densities can be found acceptable for food service applications.

Additional enhancements in foamability and foam quality can be achieved if either the concentrate itself, or the virgin or recycle polyester feed to which the concentrate is added, or both, are first treated with an aqueous solution of alkali or alkaline earth metal compound, preferably aqueous sodium hydroxide, under conditions of time and temperature sufficient to incorporate about 10 to about 175 ppm of alkali or alkaline earth metal in the total composition intended for foaming. Suitable conditions for achieving such incorporation comprise an aqueous wash with the alkali or alkaline earth metal compound for about 2 to about 30 minutes at a temperature of from about 85° to about 105° C. The beneficial effects of such treatment are surprising in that the prior art (see e.g., Hayashi et al. '991 discussed above) teaches that the presence of a group I, II, or III metal at levels under about 220 ppm does not impart any processing advantages in the foaming of branched polyester. While these low levels of metal, preferably sodium, may be employed to significant advantage in the present invention, this does not preclude the use of additional levels of sodium or other compounds of Group I, II, or II metals as disclosed in Hayashi et al U.S. Pat. No. 5,000,991.

Use of the above-described concentrates in the process of the present invention allows a high melt strength extrusion mass to be formed during the latter portions of the extruder residence time, while avoiding high viscosity at the beginning of the extrusion. Conventional melt-strength improved resins obtained by melt processing a branching compound with resin, wherein the branched resin is then remelted for use in fabricating articles, typically suffer from production rate limitations due to high viscosity near the loading end of the extruder. The present invention solves this problem not only in the context of foaming extrusion but in other fabrication contexts where production rates are important, (e.g. extrusion blow molding, injection molding, etc.). Accordingly, the invention is further directed to a process for melt processing polyester comprising: (1) formation of a molten mixture comprising (i) a major amount of a first resin composition comprising polyester and from 0 up to about 1 wt. % of a compound capable of branching the polyester, and (ii) a minor amount of a second polyester resin composition comprising at least about 50 wt. % polyester resin and greater than about 2 wt. % of a compound capable of branching the polyester, wherein the relative amounts of (i) and (ii) are such that said molten mixture comprises from about 0.1 wt. % to about 1 wt. % of said branching compound; (2) melt-processing of the resultant molten mixture under conditions of time and temperature sufficient to enhance the melt strength of the mixture; and (3) direct fabrication of the molten mixture into a film, sheet or injection rholded article. Suitable melt-processing conditions are those sufficient to produce a desirable increase in the melt strength of the resin without causing unacceptable amounts of degradation in the resin. Residence times of about 1 to about 20 minutes at temperatures of about 240° to about 310° C. are acceptable. Melt processing can be performed via screw-type extrusion, but is not limited to that technique. Melt strength enhancement is evident when the melt exhibits shear thinning characteristics at low shear rates, i.e., 1 $Sec^{-1}$. The term "direct fabrication" as used herein should be understood to mean that the molten mixture obtained in the process of the invention as described above is not first converted to powder or pellets for subsequent remelting in a later melt fabrication of desired articles, but is instead immediately melt fabricated into such articles.

A further discovery of the present invention is that throughput of the foaming extruder can be improved without loss of other process or product advantages afforded by this invention by including a styrenic resin in the final (i.e., polyester+concentrate) composition subjected to foaming in the invention. Specifically, this feature of the invention involves incorporating an amount of styrenic resin, preferably polystyrene, in the polyester composition to be foamed in amounts effective to improve the throughput of the foaming extruder. In a preferred embodiment this feature of the invention can approximately double foaming extruder throughput. We have determined that an amount of styrenic resin greater than about 1 wt. % and particularly within the range of about 5 to about 20 wt % polystyrene, based on the weight of the total composition being foamed, is effective for providing significant throughput improvements in the polyester foaming process of the invention. Amounts of polystyrene above or below this range can be employed as desired. However, at increasingly high levels of polystyrene, the sought after property advantages of polyester foam tend to merge with those of polystyrene, whereas at lower levels of polystyrene throughput improvements may become de minimus. In addition to increasing extruder throughput, the presence of styrenic resin also expands the operating range of the polyester foaming composition. The styrenic resins useful for improving extruder throughput according to the invention are resins containing repeating units having the following general formula:

wherein $R_1$ represents an aromatic hydrocarbon radical, or an aromatic halohydrocarbon radical of the benzene or substituted benzene series, and $R_2$ is either hydrogen or the methyl radical. Resins which can be used as the styrenic foam core resin include such alkenyl aromatic compounds as the solid homopolymer of styrene; alpha-methyl styrene; ortho-methyl styrene; meta-methyl styrene, para-methyl styrene; the solid copolymers of one or more of such alkenyl aromatic compounds with amounts of other polymerizable compounds such as methylmethacrylate, acrylonitrile, maleic anhydride, acrylic acid, and the like; impact polystyrene, which is a polystyrene modified by or containing elastomer moieties, such as styrene butadiene or polybutadiene; and blends of a styrenic resin such as polystyrene/poly(2,6-dimethylphenylene oxide). Other modified polystyrene resins which can be used in the invention include brominated or halogenated polystyrene such as polydibromo styrene (e.g., PDBS-10 and PDBS 80 commercially sold by Great Lakes Chemicals).

With respect to extrusion conditions for carrying out the foaming process of the invention, such conditions can be adjusted in a manner known to those of ordinary skill in the art. Broadly speaking these conditions should be adjusted such as to allow the completion of the reaction between the branching compound present in the concentrate and the polyester resin to which the concentrate has been added. In general, the foam extruder residence time should be in the range of about 2 to about 20 minutes and barrel zone temperatures should be in the range of about 210° C. to about 310° C.

The type of extrusion equipment suitable for carrying out the process of the invention is a matter of selection within the skill of the art. For example, the process can be performed on a single screw, twin screw, planetary gear extruder. Often these different types can be arranged in tandem, with the second extruder in the tandem arrangement used to cool the melt.

Any suitable physical or chemical blowing agent, or blowing agent mixture, can be used in the production of polyester resin foams in the present invention, so long as such agent or mixture thereof is easily vaporizable or thermally decomposable. Easily vaporizable blowing agents include inert gases, such as argon, saturated aliphatic hydrocarbons, saturated alicyclic hydrocarbons, aromatic hydrocarbons, halogenated hydrocarbons, ethers and ketones are preferred. Examples of easily vaporizable blowing agents include carbon dioxide, nitrogen, methane, ethane, propane, butane, pentane, hexane, methylpentane, dimethylbutane, methyl cyclopropane, cyclopentane, cyclohexane, methylcyclopentane, ethylcyclobutane, 1,1,2-trimethyl cyclopropane, trichloro monofluoro methane, dichloro difluoro methane, monochloro difluoromethane, trichloro trifluoro ethane, dicloro tetrafluoro ethane, dichloro trifluoro ethane, monochloro difluoro ethane, tetrafluoroethane, dimethyl ether, 2-ethoxy acetone, methyl ethyl ketone, acetylacetone dichloro tetrafluoro ethane, monochlorotetrafluoroethane, dichloro monofluoro ethane and difluoroethane. Particularly preferred blowing agents are butane, propane, ethane, pentane, Freon 11, Freon 22, Freon 134*a*, Freon 142*b*, carbon dioxide, nitrogen, water and suitable mixtures thereof.

The blowing agent is injected into the molten blend of the polyester resin, concentrate and other additives present in the extruder. The amount of the blowing agent to be injected is from 0.05 to 50% by weight based on the amount of the molten blend. When the amount of the blowing agent is less than 0.05% by weight, the resulting foam is not sufficiently expanded, while when the amount is more than 50% by weight, the gas of the blowing agent is not accommodated for foaming, but blows off and the foam cannot be formed into a desired shape. A particularly preferred amount of the blowing agent is 0.1 to 30% by weight based on the amount of the molten blend.

The present invention also contemplates use of chemical blowing agents such as mixtures of sodium bicarbonate and citric acid.

A wide variety of economical articles are made possible by the concentrate and process of the invention. Examples of such articles are building insulation board having R value of at least 4 per inch and preferably at least about 5 per inch, and food packaging articles such as bowls, cups and trays which can withstand conventional and microwave oven conditions necessary for heating pre-cooked foods to serving temperature. Examples of other foamed articles that can be manufactured using the invention are flotation devices, cushioning articles, sound reduction and sound absorption materials, automobile headliners, highway sound barriers, foamed bats for baseball and softball and other toy or novelty items, and decorative molding such as artificial wood trim, etc.

The present invention can be used to obtain foamed polyester articles having densities in the range of about 0.02 to about 0.9 grams/cc. Within this range, preferred densities for polyester foam building insulation are in the range of about 0.03 to about 0.15 grams/cc, while preferred densities for food trays are are in the range of about 0.06 to about 0.3 grams/cc.

Single or double laminate articles, such as food containers or trays, can be produced by bonding a non-foam film of a thermoplastic resin to one or both sides of an extrusion polyester foam sheet produced according to the invention, followed by thermoforming the laminate to obtain a food container of desired shape. If desired, the solid resin film laminated to one or both sides of the polyester foam core can be selected such that it will impart oxygen barrier properties to the food tray or container. Suitable processes for producing single or double laminates are disclosed in Mazur, U.S. Pat. No. 3,699,794 and Whelan et al., U.S. Pat. No. 3,616,020 incorporated by reference herein. Although the laminates described in Mazur and Whelan et al. include laminates in which an impact modified polystyrene layer is extrusion coated onto a polystyrene foam sheet, the processes disclosed in these patents can also be applied to the extrusion lamination of a resinous layer onto a polyester foam core layer. A polyester foam core sheet produced according to the present invention can also be substituted for a polystyrene foam core layer in the multi-layer construction of Luetkens, Jr. et al., U.S. Pat. No. 5,128,196.

Examples of thermoplastic resins suitable for lamination as a non-foam layer to a polyester foam sheet of the invention include liquid crystal polyester resins, polyolefin resins, polyamide resins, polyvinyl chloride resins, polyacrylonitrile resins, polyvinylidene chloride resins and ethylene-vinyl alcohol copolymers. The relative thicknesses of the non-foam layer and the polyester foam layer can be adjusted depending upon the end uses intended for particular laminate articles. In addition to the patents referred to above, various methods for laminating a non-foam layer onto a polyester foam sheet are discussed in Hayashi et al., U.S. Pat. No. 5,000,991, for example, the foam sheet and the non-foam sheet can be separately prepared and separately wound up into rolls and then laminated onto each other while unwinding and passing through a pair of rollers.

The laminates described above can be thermoformed into a variety of articles, such as food service articles, using techniques which are well known in the art. For example, the thermoforming can be carried out by using a molding die. The die may be composed of a male mold and a female mold, but may be composed of either one of them. When a die composed of both molds is used, molding can be carried out merely by putting the laminated sheet between both molds and pressing it. However, when either one of molds is used, air present between the sheet and mold is removed, or the sheet is pressurized from the upper side thereof and pressed.

With respect to the production of articles, including foamed articles, a particularly advantageous and unexpected feature of the present invention is that such articles can be produced with substantially reduced levels of unreacted branching compound (e.g. pyromellitic dianhydride) as compared with foam extrusion in which branching compound, instead of being charged to the process as an extruded concentrate, is added as a neat material (e.g. in powder form) directly to the foaming extruder. Accordingly, the present invention is further directed to polyester articles comprising a branching compound selected from compounds having two or more acid anhydride groups per molecule, said branching compound being present in the article in the form of (i) a reaction product of said branching compound and said foamed resin and (ii) unreacted branching compound; and wherein the ratio of the amount of reacted+unreacted branching compound to the amount of unreacted branching compound, is greater than about 20:1 when the amount of reacted+unreacted branching compound in the article is greater than about 5000 ppm based on the weight of the article; or 40:1 when the amount of reacted+unreacted branching compound in the article is less than about 5000 ppm.

The reason for making a distinction between articles having greater than or lesser than about 5000 ppm total branching compound is due to minor limitations in the ability of the analytical technique described herein to detect all of the unreacted branching compound in a given sample. This difficulty results in ratios of total to unreacted branching agent which tend to be slightly higher than expected at lower levels of total branching compound. The analytical methods used to measure total versus unreacted branching compound in a polyester sample are described in Example C and D, below.

Foamed articles made according to the invention, wherein the branching compound comprises pyromellitic dianhydride in a total amount of about 1500 ppm to about 5000 ppm in the article, will preferably contain less than about 100 ppm unreacted PMDA based on the weight of the article. When the total amount of PMDA is in the range of about 5000 ppm to about 6000 ppm, the amount of unreacted branching compound in the article will be less than about 150 ppm based on the weight of the article. When the total amount of PMDA is about 6000 ppm to about 8000 ppm in the article, the amount of unreacted PMDA will be less than about 375 ppm based on the weight of the article. These amounts of unreacted PMDA represent reductions of about 50 to 75% over the levels obtained in a polyester extrusion process which does not employ the concentrate addition technique of the present invention. While reductions in free PMDA may be particularly advantageous in end use applications involving food contact, the general benefit in eliminating a freely reactive branching compound from finished articles in any application will be readily appreciated.

The following examples will serve to illustrate but not limit the present invention. In the following examples, all PET resin samples including concentrates were dried in a forced air dessicant oven at 120° C. overnight prior to use.

EXAMPLE C

Analysis of Total PMDA in PET Foam

1. Weigh 0.5000 gram foam sample into a 100 ml 1-neck round bottom boiling flask.

2. Add 20 ml dimethylsulfoxide (DMSO) to flask via 20 ml volumetric pipet.

3. Add 5 ml 5N alcoholic sodium hydroxide (NaOH) to flask via 10 ml transfer pipet.

4. Set up flask to reflux with stirring using a heating mantle plugged into a variac to heat and a stirring bar/stir plate to stir.

5. After sample has dissolved (~½ to 1 hour after start of heating), turn off heat and replace heating mantle with a cork ring to allow samples to cool with continued stirring.

6. After sample has cooled to room temperature, add 50 ml deionized water to the flask via 50 ml volumetric pipet to dissolve the sodium salts. At this point, sample should be clear.

7. Determine PMDA concentration using high performance liquid chromatography (HPLC) by eluting an aliquot of the neutralized sample through a high pressure liquid chromotography (HPLC) system using a concentration-gradient mobile phase of acetonitrile/water. The method is calibrated using standards containing known amounts of PMDA. The calibration curve for these standards is not linear; compensation for this is made by bracketing sample analyses with analyses of standards containing PMDA in the same range as the samples.

EXAMPLE D

Analysis of Extractable ("Free") PMDA in PET Foam

1. Weigh 1.000 gram of foam sample into a 100 ml 1-neck round bottom boiling flask.

2. Add 25 ml nitrobenzene to flask via topsider dispenser or 25 ml volumetric pipet.

3. Set up flask to reflux with stirring using a heating mantle plugged into a variac to heat and a stirring bar/stir plate to stir. Note: any talc and/or sodium carbonate in the sample will not dissolve in the nitrobenzene.

4. After sample has dissolved (~½ hour after start of heating in most cases), turn off heat and replace heating mantle with a cork ring. Continue stirring and allow sample to cool to room temperature on its own (do not quench in ice or cold water bath). Note: the PET will precipitate from the nitrobenzene ~85° C. and form a continuous viscous liquid; however, the PMDA will remain in solution in the nitrobenzene.

5. After sample has cooled to room temperature, add 50 ml deionized water to the flask via 50 ml volumetric pipet and continue stirring (amount of time is not critical).

6. Homogenize PET/nitrobenzene slurry with the water using a Bio-homogenizer mixer for ~2 minutes at high speed. If PET has formed a particularly stiff viscous liquid upon precipitation from the nitrobenzene, ensure that all material comes in contact with the water by moving the homogenizer probe around the entire area of the flask. This is a critical point in the procedure, as the water extracts the PMDA from the nitrobenzene.

7. Perform high performance liquid chromatography (HPLC) on the aqueous phase obtained in step 6 by eluting an aliquot of the water portion of the sample through a high pressure liquid chromatography system using a concentration-gradient mobile phase of acetonitrile/water. The method was calibrated using standards containing known amounts of PMDA.

In the above procedure it is found that a small residual amount of unreacted PMDA cannot be extracted from the nitrobenzene phase, hence the procedure tends to slightly understate the amount of extractable, or free PMDA in a given sample. Notwithstanding this difficulty, the procedure is quite suitable for determining differences in extractable PMDA among different foam samples as well as for determining whether a particular foam sample meets the requirements of the present invention.

COMPARATIVE EXAMPLE 1

(unstable foam process)

A mixture comprising 97.95 wt % PET (Goodyear 7207), 1.0 wt % pyromellitic dianhydride (PMDA) obtained from Diacell, 0.3 wt. % $Na_2CO_3$ (Aldrich), and 0.75 wt % talc (Cyprus Mineral Co. Mistron Monomix) was melted and further mixed with Freon-22 using a ZSK-30® corotating twin screw extruder to produce a polyester foam. The extruder (35:1 L/D), 30 mm screw diameter) was supplied by Werner and Pfliederer Inc. and was operated at a rate of 14 lb/hr through a 2"×0.35" slot die using a screw rotation speed of 75 rpm. The screw design consisted of a feed conveying section followed by a melt seal, continuing with conveying and mixing sections to the die. Fifteen separate temperature controllers were used to control process temperatures from the feed hopper (zone 1) to the die (zone 15). Temperatures were maintained at 245°, 260°, 290°, 290°, 295°, 295°, 290°, 270°, 265°, 260°, 250°, 240°, 240°, 240°, 220° C. from zones 1 through 15 respectively. The PET pellets were fed to the extruder using a K-tron® S-200 volumetric feeder. The PMDA, talc, and sodium carbonate were fed using an AccuRate® dry material feeder into the same extruder fed throat as the PET pellets. The Freon-22 was fed into the extruder immediately downstream of the melt seal using an American Lewa® diaphram liquid metering pump. Extruder torque (as a percent of designed capacity) and die pressure were monitored continuously during foam production. The extrudate exited the die into a region of atmospheric pressure and entered conventional shaping and haul off equipment. During an extended run during which no process parameter changes were made, samples of the foam extrudate were collected at regular (10 minute) time intervals and the corresponding extruder torques and die pressures recorded. As shown in Table 1 below, the extruder torque and foam quality both varied significantly over the course of this run, despite the stability of process settings. Extruder torque oscillated between 47% and 84% of full scale, while foam density ranged from 10 to 39 pounds per cubic foot, indicating instability in the process in which PET is co-fed with an additive package such as PMDA, sodium carbonate, and talc to a foaming process at the concentrations identified. This instability was not eliminated by dry blending the additives with PET and an optional small amount of mineral oil to allow feeding with a single feeder. Elimination of sodium carbonate from the feed stream did not eliminate the process instability.

TABLE I

| Time (minutes) | Density (g/cc) | Torque (% of full torque | Die Pressure (psi) |
|---|---|---|---|
| 10 | 0.56 | 54 | 100 |
| 20 | 0.26 | 68–70 | 150 |
| 30 | 0.15 | 61–64 | 260–310 |
| 40 | 0.58 | 75–78 | 160–170 |
| 50 | 0.18 | 80–82 | 260–320 |
| 60 | 0.18 | 75–79 | 270–330 |
| 70 | 0.19 | 81–84 | 270–400 |
| 80 | 0.19 | 78–81 | 270–340 |
| 90 | 0.19 | 74–77 | 290–390 |
| 100 | 0.21 | 74 | 260–300 |
| 110 | 0.20 | 70 | 240 |
| 120 | 0.59 | 60 | 180 |
| 130 | 0.30 | 57 | 130 |

TABLE I-continued

| Time (minutes) | Density (g/cc) | Torque (% of full torque | Die Pressure (psi) |
|---|---|---|---|
| 140 | 0.55 | 47 | 120 |
| 150 | 0.27 | 59 | 150 |
| 160 | 0.41 | 52 | 120 |
| 170 | 0.26 | 58 | 120 |
| 180 | 0.16 | 70–74 | 220–250 |
| 190 | 0.24 | 73 | 210 |
| 200 | 0.52 | 64–68 | 170 |
| 210 | 0.26 | 68–70 | 170 |
| 220 | 0.24 | 70 | 200 |
| 230 | 0.28 | 70–72 | 190–230 |
| 240 | 0.30 | 63 | 160 |
| 250 | 0.63 | 54 | 130–160 |
| 260 | 0.35 | 52 | 100 |
| 270 | 0.50 | 53 | 110 |
| 280 | 0.45 | 50 | 110 |

EXAMPLE 1

(Stable Process Using Concentrate of the Present Invention)

In this example, large amounts of PMDA, talc, and $Na_2CO_3$ are concentrated into PET instead of being added directly to the foaming extruder as in Comparative Example 1. These concentrates are added to additional PET to achieve the desired final concentration of each additive in the final product. Thus a concentrate according to the invention was prepared by mixing of 79.5 wt % PET, 10 wt % PMDA, 3 wt % $Na_2CO_3$, and 7.5 wt % talc in a Haake System 90 Torque Rheometer with single screw extruder attachment. The ¾" diameter screw was a standard metering type with L/D of 25:1, and 3:1 compression ratio. The material was compounded at 120 RPM with a temperature profile from feed throat to die of 280°/280°/280° C. The extrudate polymer strand was passed through a water bath and pelletized. After drying, these concentrate pellets were mixed in a 1:9 ratio with unmodified PET and fed using a K-tron S200 volumetric feeder into a ZSK-30 twin screw extruder for reactive extrusion and foaming under process conditions comparable to Comparative Example 1. In this example the resin feed rate was measured to be 11 pounds/hour, and the temperatures were maintained 245°, 260°, 290°, 290°, 295°, 295°, 290°, 270°, 265°, 260°, 250°, 235°, 230°, 225°, and 215° C. from zones 1 through 15 respectively. Samples, torque and pressure readings were collected at regular (10 minute) time intervals as in Comparative Example 1. The torque recorded during this example varied between 78% and 85% full scale load as shown in Table 2. The foam product quality was observed to be significantly more uniform than that of Comparative Example 1. Foam density ranged from 7.2 to 8.8 pounds per cubit foot.

TABLE II

| Time (minutes) | Density (g/cc) | Torque (% of fill torque | Die Pressure (psi) |
|---|---|---|---|
| 10 | 0.13 | 80–83 | 270–290 |
| 20 | 0.14 | 82–84 | 260–300 |
| 30 | 0.14 | 80–83 | 270–290 |
| 40 | 0.13 | 80–82 | 250–270 |
| 50 | 0.13 | 79–83 | 260–280 |
| 60 | 0.12 | 78–81 | 260–270 |
| 70 | 0.14 | 81–84 | 210–330 |
| 80 | 0.14 | 81–83 | 240–310 |
| 90 | 0.13 | 78–80 | 260–310 |

TABLE II-continued

| Time (minutes) | Density (g/cc) | Torque (% of fill torque | Die Pressure (psi) |
| --- | --- | --- | --- |
| 100 | 0.12 | 80–84 | 270–340 |
| 110 | 0.12 | 82–85 | 270–410 |
| 120 | 0.14 | 81–84 | 270–340 |
| 130 | 0.13 | 80–83 | 250–300 |

COMPARATIVE EXAMPLE 2

(Unstable Process)

Goodyear 7207 was dry blended with 1.0 wt % PMDA, 0.3 wt % $Na_2CO_3$ and 0.75 wt % talc and fed into a ¾" single screw extruder attached to a Haake System 90 torque rheometer. The extruder screw had a standard metering profile with 3:1 compression ratio and 25:1 L/D ratio. The temperature profile was 260°/280°/280°/280° C. from feed hopper to die as in Example 1. The materials were extruded through a 0.06" diameter stranding die at 60 RPM while the torque and final barrel pressure were recorded as a function of time. Pressures ranged from <800 to >3600 psi, while torque oscillated mainly between 15 and 40 Newton-meters. The process was apparently cycling as opposed to merely exhibiting one torque maximum and then a decline. PET processed under similar conditions without any reactive additives resulted in an extruder torque of about 15 Newton-meters which suggests that the reaction between PET and PMDA is not being consistently completed during processing in the manner of this example. The variations seen in the IV's of material collected at the torque/pressure peaks and valleys of this run supported this conclusion. This example provides further evidence that co-feeding PET with a viscosity modifying additive package such as PMDA, sodium carbonate and talc to the extrusion foaming process in the identified concentrations is not a stable process.

EXAMPLE 2

(Stable Process Using Invention)

A sample of the concentrate produced in Example 1 was dry blended in a 1:9 ratio with unmodified PET and extruded through the Haake torque rheometer as in Comparative Example 2. Pressures range between 2400 and 3200 psi after startup, while torque oscillates mainly between 26 and 32 Newton-meters. This oscillation is dramatically reduced from that observed in Comparative Example 2. This example and Example 1 illustrate that the process oscillations associated with the method described in Comparative Examples 1 and 2 can be dramatically reduced by employing the method described in this invention, i.e., concentrating the additive package into a carrier resin prior to adding these components to the foaming extruder.

EXAMPLE 3

(The Invention Using Separate Additive Concentrates)

In this experiment, the branching agent, nucleant and catalysts were each concentrated separately into a carrier resin. A concentrate "A" consisted of 90 wt % PET and 10 wt % PMDA, a concentrate "B" consisted of 97 wt % PET and 3 wt % $Na_2CO_3$, and a concentrate "C" consisted of 92.5 wt % PET and 7.5wt % talc. Concentrates A, B, and C were prepared using the Haake single screw extruder. One pound of each concentrate (A, B, and C) was dry blended with seven pounds of PET and fed into the ZSK-30 twin screw extruder for foaming. The torque was stable and the process produced a foam of excellent quality comparable to that obtained in Example 1. This experiment demonstrates that it is not critical for any two of the additives to be co-concentrated for the final foam product to be produced in a stable manner. The process has been repeated using concentrates prepared on the ZSK-30 extruder instead of the Haake system 90 rheometer. The process stability and foam quality are excellent irrespective of which machine was used to prepare the concentrates.

EXAMPLE 4

Using a Haake torque rheometer with mixing bowl attachment, Goodyear 7207 PET was mixed with various amounts of PMDA powder (Chriskev) and sodium carbonate powder (Aldrich) at 270° C. The bowl volume was 60 cc and the roller type blades were rotated at 60 RPM. The torque needed to rotate the blades was monitored on a continuous basis by the software provided with this instrument. In each experiment, a large torque increase was noted immediately after adding 72 grams of the pellet/powder mixture to the bowl. This peak is commonly referred to as the loading or melting peak. The maximum melt mixing torque reported in Tables III and IV refers to torques obtained after the pellets are completely melted. In each run reported in the tables below, the maximum melt-mixing torque was obtained in less than ten minutes after completion of melting. Tables III and IV contain the torque results showing the criticality of utilizing amounts of branching agent greater than about 2 wt % to compound the concentrate of the invention. The full torque curves for the concentrates of Table III are plotted in FIG. 1, whereas the torque curves for the Table IV concentrates are plotted in FIG. 2.

TABLE III (Torque Data for Concentrates Containing PET, Sodium Carbonate and PMDA)

| wt % PMDA | Maximum Melt Mixing Torque (Newton-meters) |
| --- | --- |
| 0 | 2 |
| 0.5 | 17 |
| 1.0 | 22 |
| 2.0 | 6 |
| 10 | 1 |

TABLE IV (Viscosity Data for Concentrates Containing PET and PMDA Without Sodium Carbonate)

| wt % PMDA | Maximum Melt Mixing Torque (Newton-meters) |
| --- | --- |
| 0 | 1 |
| .5 | 9 |
| 1.0 | 11 |
| 1.5 | 6 |
| 2.0 | 3 |
| 10 | 1 |

EXAMPLE 5

(Foam Tray of the Invention)

In this experiment, the ZSK-30 described above was used to produce Concentrates A and B as described in Example 3.

Concentrate A consisted of 90 wt % Goodyear 7207 PET and 10 wt % PMDA. Concentrate B consisted of 97 wt % Goodyear 7207 and 3% $Na_2CO_3$. The concentrates were added to the extruder with a PET mixture containing 25% Goodyear PET 9506 regrind and 25% virgin PET 9506. The relative amounts of the concentrates and the 9506 resin were such that the amount of PMDA in the total composition intended for foaming was 0.2 wt. % and the final amount of sodium carbonate was 0.04 wt. %. Foam production took place using an Egan 4.5 inch diameter single screw extruder modified with a gas delivery system. The seven barrel zones and the extrusion die were set at the following temperatures: 540°, 540°, 540°, 520°, 520°, 520° and 520°, and 520° F. A flat sheet die was used to produce PET foam sheet. A dry mixture of Concentrates A and B was fed into the extruder through a side feed hopper separately from the above described mixture of virgin and regrind 9506 PET resin. The PET 9506 resin and the concentrates were dried to moisture levels of under 50 ppm prior to addition to the extruder. Foam was produced at a nominal rate of 600 pounds/hour. $CO_2$ was injected into the 4th barrel segment of the seven zone extruder. This resulted in a final foam product containing 0.2% PMDA and 0.04% $Na_2CO_3$ by weight. The foam sheet had a density of approximately 30 pcf (despite passing through a three roll stack) and was successfully thermoformed into trays. The trays, when analyzed for extractable PMDA using the analytical techniques of Examples A and B, had levels of unreacted PMDA in the range of about 30 ppm to about 40 ppm based on the weight of the tray.

The procedures of this example were repeated, except that the levels of PMDA and sodium carbonate were increased to 0.3 wt. % and 0.06 wt. %, respectively, based on the weight of the total composition being foamed. The resultant extruded foam sheets had a density of 9 pcf. Trays thermoformed from the sheet had density of about 28 pcf.

EXAMPLE 6

(Insulation Board of the Invention)

A sheet of foam insulation according to the invention was made as follows. A ZSK-30 extruder was used with a temperature profile (15 zones feeder to die) as follows: 245°, 260°, 290°, 290°, 295°, 295°, 290°, 270°, 265°, 250°, 235°, 225°, 220°, 220°, and 220° C. Freon-22 was fed in the 7th barrel section at a rate of 2 wt % with respect to the resin feed of about 19 lb/hour. The resin feed to the extruder hopper was a dry mixture containing 91.67 wt. % Goodyear 7207 PET, 5 wt. % of Concentrate "A" of Example 3, and 3.33 wt % of Concentrate "B" of Example 3. Upon exiting the die the foam was passed through a forming table using a belt puller device at a rate of 40 inches/minute The observed torque was between 92 and 96% full scale. Pressure at the die was 440–540 psi while that at the point of gas injection was 260–280 psi. The screw profile used consisted of conveying elements in the feeding/melting zones, a melt sealing device at the 6th barrel section, and conveying elements towards the die. The resultant foam had a density 6.3 pcf, and cell size 0.56 mm. The foam sheet had thickness of 0.6 inches, compressive strength of 53 psi, and excellent moisture and thermal dimensional stability. The process set forth in this example results in foam insulation boards having R values of at least 4 per inch.

EXAMPLE 7

(Extractable PMDA Levels in Foam Articles)

Foam trays and sheets were manufactured from PMDA branched PET using the concentrate described in Example 1. The samples were obtained from the trays or sheets obtained in Examples 5 and 6. The foam samples were measured for total PMDA and extractable PMDA (i.e. unreacted PMDA) using the analyses of Examples A and B. The results are reported in Table V below.

TABLE V

The Invention-Concentrate Addition of PMDA

| Sample # | Total PMDA (ppm) | Extractable PMDA (ppm) |
|---|---|---|
| 1 | 1320 | (none detected) |
| 2 | 1530 | (none detected) |
| 3 | 1860 | (none detected) |
| 4 | 1960 | 15 |
| 5 | 2000 | 35 |
| 6 | 2400 | 39 |
| 7 | 2600 | 27 |
| 8 | 2300 | 28 |
| 9 | 4100 | 43 |
| 10 | 4100 | 42 |
| 11 | 4100 | 61 |
| 12 | 4200 | 46 |
| 13 | 2900 | 24 |
| 14 | 3200 | 13 |
| 15 | 3000 | 21 |
| 16 | 3000 | 27 |
| 17 | 7300 | 361 |
| 18 | 7500 | 253 |
| 19 | 5472 | 53 |
| 20 | 5699 | 55 |
| 21 | 5226 | 52 |
| 22 | 4840 | 55 |
| 23 | 4867 | 55 |
| 24 | 4712 | 55 |
| 25 | 4457 | 55 |
| 26 | 4788 | 55 |
| 27 | 4731 | 55 |
| 28 | 4322 | 55 |
| 29 | 4400 | 55 |
| 30 | 4329 | 56 |
| 31 | 6700 | 120 |
| 32 | 6900 | 200 |
| 33 | 7600 | 210 |
| 34 | 7300 | 200 |
| 35 | 6500 | 180 |
| 36 | 2900 | 30 |
| 37 | 3100 | 70 |
| 38 | 3000 | 47 |
| 39 | 6700 | 120 |
| 40 | 5002 | 55 |

COMPARATIVE EXAMPLE 7

(Extractable PMDA Levels in Foam Articles—Direct Addition of PMDA Powder)

Foam samples were manufactured from PMDA-branched PET using a direct addition of PMDA to the foaming extruder as generally described in Hayashi et al U.S. Pat. No. 5,000,991. The foam samples were measured for total PMDA and extractable PMDA (i.e. unreacted PMDA) using the analyses of Examples A and B. The results are reported in Table VI below. Samples 1 and 2 were taken from commercially available PET foam trays believed to be prepared from a polyester foaming process in which PMDA is added as a powder directly to the foaming extruder.

TABLE VI

(Comparative)-Powder Addition of Neat PMDA

| Sample # | Total PMDA (ppm) | Extractable PMDA (ppm) |
| --- | --- | --- |
| 1 | 2700 | 166 |
| 2 | 3000 | 183 |
| 3 | 4808 | 160 |
| 4 | 4820 | 163 |
| 5 | 4652 | 110 |
| 6 | 4759 | 159 |
| 7 | 5177 | 166 |
| 8 | 4945 | 166 |
| 9 | 5425 | 162 |
| 10 | 4669 | 163 |
| 11 | 4669 | 163 |
| 12 | 4775 | 163 |
| 13 | 5366 | 166 |
| 14 | 5361 | 166 |
| 15 | 5353 | 162 |
| 16 | 5194 | 166 |
| 17 | 7000 | 440 |
| 18 | 6500 | 420 |
| 19 | 6800 | 630 |
| 20 | 6700 | 590 |
| 21 | 6500 | 380 |
| 22 | 3300 | 190 |
| 23 | 3000 | 150 |
| 24 | 3000 | 150 |
| 25 | 3000 | 230 |
| 26 | 2800 | 260 |
| 27 | 1420 | 72 |
| 28 | 1460 | 66 |
| 29 | 1470 | 63 |

EXAMPLE 8

Sodium Incorporation—The Invention

Goodyear 7207 PET pellets were ground to powder and slurried in a 4% NaOH solution at a temperature of about 95° C. for 10 minutes. The powder was then rinsed with water and dried. This process resulted in the incorporation of 33.9 ppm sodium into the resin sample. Sodium analysis was carried out using inductively coupled plasma spectroscopy (ICP). The aforementioned PET resin sample, and additional commercially procured PET samples containing varying levels of sodium, were studied as follows. A total of 7 PET samples containing varying levels of sodium were mixed with concentrate of the invention containing 10 wt. % PMDA. The final mixtures, all of which contained 1.0 wt. % PMDA, were melt mixed in a Haake mixing bowl at 270° C. and 60 RPM. The results of the Haake mixing bowl study are shown in Table VII, below. The table reports starting torque of the melt system prior to reaction of PMDA and PET, the maximum torque reached in the system following reaction, the time to reach this maximum torque, and the rate of increase in torque. These results show that about 30 ppm sodium affords a significant improvement in the reactivity of PMDA and PET. The process of the invention can thus be enhanced when sodium is incorporated into the polyester resin at relatively low levels using the caustic wash described above.

TABLE VII

| Sample # | ppm Na | Torque-minimum (meter grams) | Torque-maximum (meter grams) | Time to Tq-max (sec) | Rate (meter-grams/min.) |
| --- | --- | --- | --- | --- | --- |
| 1 | 5.6 | 259 | 823 | 561 | 123 |
| 2 | 57 | 352 | 1853 | 352 | 481 |
| 3 | 45 | 326 | 1496 | 362 | 353 |
| 4 | 5.6 | 223 | 1035 | 492 | 170 |
| 5 | 43 | 331 | 1952 | 330 | 540 |
| 6 | 9.3 | 186 | 849 | 580 | 154 |
| 7 | 33.9 | 384 | 1333 | 356 | 340 |

EXAMPLE 9

This example demonstrates that PET foams of inferior quality are obtained when PET extrusion foaming is attempted using a branching agent concentrate compounded with polystyrene or polypropylene instead of polyester. In each of the examples (a) through (c) below, the concentrates were prepared using a Haake System 90 torque rheometer with a ¾" 25:1 L/D single screw extruder attachment. A metering screw with a 3:1 compression ratio was used. The PMDA and sodium carbonate were dried before compounding. The mixtures were dry blended, extruded and pelletized. The concentrates were dried before use in foaming.

(a) (invention) A mixture was prepared containing 91.67 wt % PET, 5 wt % of Concentrate A of Example 3, and 3.33 wt % of concentrate B of Example 3. A ZSK-30 twin screw extruder was used. Zones 1 and 2 were off. Zones 3–15 were set to the following temperatures: 250°, 280°, 295°, 295°, 290°, 280°, 275°, 270°, 250°, 240°, 240°, 230° and 230° C. Maximum throughput of 122 g/min was achieved at a typical torque reading which was 77–85% of the extruder torque capacity. A foam of excellent quality was obtained.

(b) (comparison—PS used as concentrate carrier resin), the foaming extrusion of Example 9(a) was repeated under identical conditions except that polystyrene was substituted for PET in Concentrate A and Concentrate B. The extruder torque readings ranged between 47–51% of the extruder torque capacity. Although extruder throughput was improved over run(a) above, the resultant foam was of markedly inferior quality to that produced in (a) above.

(c) (comparison—PP used as concentrate carrier resin) The foaming extrusion of Example 9(a) was repeated except that polypropylene was substituted for PET. Under operating conditions identical to the examples above, a typical extruder torque reading was 49–55% of the extruder torque capacity. A foam was obtained which was markedly inferior to that obtained in (a) above.

EXAMPLE 10

This example (runs (a) and (b)) demonstrates that the presence of 10 wt % polystyrene in a PET composition being foamed according to the concentrate technique of the invention, significantly reduces the measured torque on the foaming extruder, hence allowing higher feed rates, without effecting the quality of the foamed product. Comparison Examples 10(c) and 10(d) illustrate that this advantage is not obtained using polypropylene or high density polyethylene.

(a) (invention—without polystyrene in foamed composition). A dry mixture mixture was prepared containing .91.67 wt % PET, 5 wt % of Concentrate A of Example 3, and 3.33 wt % of Concentrate B of Example 3. The mixture was put into the ZSK-30 twin screw extruder for foaming. Foaming was carried out under conditions similar to Example 1. A maximum throughput of 120 g/min was achieved at a typical torque reading which was 91–94% of the extruder torque capacity. A foam of excellent quality was obtained having a density of 7 pcf and cell size 0.61 mm.

(b) (invention with 10 wt % polystyrene in foamed composition). In this example, the foaming extrusion of Example 10(a) was repeated, except that 10 wt % of the total composition intended for foaming was replaced with polystyrene. A throughput of 124 g/min was reached and a typical torque reading was 59–62% of the extruder torque capacity. At this throughput rate, an excellent foam was produced. The feed rate was then increased to bring the torque up to approximately the level of Example 10(a) above. A throughput of 241 g/min was reached and a typical torque reading was 93–98% of the extruder capacity. A foam was obtained having quality and density comparable to Example 10(a).

(c) (comparison). Example 10(a) was repeated except that 10 wt % polypropylene was used in place of polystyrene. The torque readings obtained under operating conditions identical to 10(a) above were 45–55% of extruder torque capacity. This run produced foam of markedly inferior quality to that obtained in Example 10(a).

(d) (comparison). Example 10(a) was repeated except that 10 wt % high density polyethylene was used in place of polystyrene. The readings obtained under operating conditions identical to 10(a) above were throughput of 139 g/min, with a typical torque reading of 79–83% of the extruder capacity. The resultant foam was markedly inferior to that obtained in Example 10(a).

Additional experiments have shown that it is advantageous to produce and use concentrates in accordance with the present invention which contain relatively little water. The advantages of low water content concentrates are illustrated by Example 11, below.

EXAMPLE 11

Concentrate pellets containing from 5 to 20 weight percent PMDA in accordance with the present invention were prepared by feeding appropriate weights of DIACEL PMDA powder obtained from Chriskev Company, Inc. of Leawood, Kans. into the feeder of a twin screw extruder under a nitrogen blanket. Also added to the feeder were appropriate weights of SHELL CLEARTUF 7207 PET, which was dried for 16 hours in a forced air oven at 150° C. The weight ratios of PET and PMDA were selected to yield a concentrate having the weight percents in the concentrate as specified in Table VIII, below. "Dry" concentrates having the PMDA concentrations listed in Table VIII were prepared by extruding the foregoing described mixtures through a ZSK-30 twin screw extruder at 100 rpm at a melt temperature of about 243° C. In the case of the 20 weight percent concentrate, the concentrate was prepared from a modified PET already containing 0.5 weight percent PMDA.

After the dry concentrates were prepared, the water content of each batch of concentrate pellets was measured by gas chromatography. A portion of each concentrate pellet batch was then "conditioned" by allowing the respective pellets to sit in a 50% relative humidity environment for 120 hours, with the water content of each conditioned batch thereafter determined by gas chromatography.

Both dry and conditioned pellets were subsequently extruded with additional dried PET and a sufficient amount of $Na_2CO_3$ to obtain an extruded product containing approximately 0.1 weight $Na_2CO_3$ and 0.5 weight percent PMDA.

The die used in the final extrusion process was equipped with a pressure transducer to measure the die pressure during extrusion. The weight percents of PMDA and water in each sample and the measured die pressures are summarized in Table VIII, below.

TABLE VIII

| % PMDA | % $H_2O$ | Die Pressure (psi) |
|---|---|---|
| 5 (dry) | 0.0221 | 1150–1410 |
| 5 (conditioned) | 0.3214 | 540–550 |
| 10 (dry) | 0.0367 | 1000–1500 |
| 10 (conditioned) | 0.4766 | 700–800 |
| 15 (dry) | 0.0259 | 1560–1580 |
| 15 (conditioned) | 0.9078 | 500–800 |
| 20 (dry) | 0.0520 | 1320–1670 |
| 20 (conditioned) | 0.9957 | 610–670 |

As can be seen by comparing the data obtained by melt processing both the "dry" and "conditioned" concentrates, die pressures for dry samples typically were about a factor of 2 higher for the "dry" concentrates. The decrease in die pressure for the conditioned samples shows that the melt viscosity of the final extruded product has been substantially decreased by the presence of water in the concentrate pellet.

The data in Table VIII illustrates the importance of producing a concentrate having a relatively low water content if the melt viscosity of a final concentrate/polyester blend is to be maintained. It is therefore preferred to produce concentrate having low water content, as concentrate in accordance with the present invention surprisingly cannot be dried after production under typical PET drying conditions without causing PMDA to sublime from the concentrate. Concentrate having a low water content may be produced by any means known in the art, such as production in cool, low humidity and/or inert environments. Of course, precautions should be taken to ensure that concentrate is not allowed to absorb water prior to subsequent melt blending operations. Water concentration in concentrate according to the present invention should not exceed 2000 ppm, preferably be less than 1000 ppm, and most preferably be less than 600 ppm.

It should be noted that the 5 to 20 PMDA weight percent concentrates described in Example 11 were tested for the presence of insoluble gels by dissolving the concentrates in boiling nitrobenzene No insoluble particles were detected by visual observation in any of the samples. This test is believed to have a sensitivity sufficient to detect the presence of insoluble gels at a level of about 0.1 weight percent or more.

Concentrates in accordance with the present invention may also be prepared from sources of recycled polyesters or mixtures of recycled and virgin polyesters. An example of one such concentrate is presented in Example 12, below.

EXAMPLE 12

In this Example, a concentrate containing 10 weight percent of PMDA was prepared in accordance with the procedure described in Example 11, except that "green flake" recycled PET was used as a PET source instead of virgin PET. The green flake recycled PET was obtained from Martin Color Fi, Inc. of Edgefield, S.C. The water content of the concentrate pellet was measured by gas chromatography to be 0.0103 percent.

The 10 weight percent PMDA concentrate was subsequently extruded with virgin PET and $Na_2CO_3$ to produce the 0.5 weight percent PMDA composition described in Example 11. The die pressure measured during extrusion ranged from 1600–2000 psi.

Example 12 shows that recycled PET compounds may be used to prepare concentrates in accordance with the present invention. The extrusion die pressure for the final extruded product prepared from virgin PET and a concentrate prepared from recycled green flake compares favorably to the die pressure measured for 10 weight percent PMDA concentrate prepared from virgin PET.

We claim:

1. A composition for improving processibility of polyester, said composition being produced by melt processing a mixture comprising at least 50 weight percent of a polyester resin and greater than 5 and no more than 20 weight percent of a polyfunctional branching compound.

2. The composition of claim 1 wherein the polyfunctional branching compound is selected from compounds having two or more acid anhydride groups per molecule and said polyester resin comprises a polyalkylene terephthalate.

3. The composition of claim 1 fabricated in the form of extruded pellets.

4. The composition of claim 2 wherein the polyester resin comprises polyethylene terephthalate, the polyfunctional branching compound comprises pyromellitic dianhydride, and the dianhydride constitutes from about 8 to about 12 weight percent of the composition.

5. The composition of claim 4 fabricated in the form of extrusion pellets and wherein the fabricated pellets contain less than 1000 parts per million of water.

6. The composition of claim 5 further comprising a nucleating agent selected from compounds of Group I, II or III metals.

7. The composition of claim 4 wherein said composition exhibits a maximum melt-mixing torque of not greater than about 1 Newton-meter.

8. A concentrate useful for melt processing with a thermoplastic polyester, said concentrate produced by melt processing a mixture comprising a polyester resin carrier and a polyfunctional branching compound, wherein the branching compound includes at least 3 branching agent reactive sites per molecule, wherein the polyester resin carrier includes highly reactive end groups, and wherein the ratio of branching agent reactive sites to highly reactive endgroups in the mixture prior to melt processing of the mixture is at least 6:1.

9. The concentrate of claim 8 wherein the polyfunctional branching compound is selected from compounds having two or more acid anhydride groups per molecule, the polyester resin carrier comprises a polyalkylene terephthalate, the polyester resin carrier comprises at least 30 weight percent of the mixture, and wherein the ratio of branching agent reactive sites to highly reactive endgroups in the mixture prior to melt processing of the mixture is between about 20:1 and 50:1.

10. The concentrate of claim 8 wherein the polyester resin carrier comprises polyethylene terephthalate, the polyfunctional branching compound comprises pyromellitic dianhydride, wherein the mixture contains at least 30 weight percent of the polyester carrier, and wherein the ratio of branching agent reactive sites to highly reactive endgroups in the mixture prior to melt processing of the mixture is between about 27:1 and 43:1.

11. The concentrate of claim 8 fabricated in the form of extrusion pellets and further comprising, a nucleating agent selected from compounds of Group I, II or III metals.

12. The concentrate of claim 10 fabricated in the form of extrusion pellets and further comprising a nucleating agent selected from compounds of Group I, II or III metals.

13. The concentrate of claim 8 wherein the concentrate contains less than 2000 parts per million of water.

14. The concentrate of claim 10 wherein the concentrate contains less than 1000 parts per million of water.

15. The concentrate of claim 9 wherein the polyester resin carrier comprises recycled polyethylene terephthalate.

16. A concentrate useful for melt processing with a thermoplastic polyester, said composition comprising a polyester resin carrier, a branching compound, one or more polyester additives selected from the group consisting of nucleating agents, stabilizers, plasticizers, expansion nucleating agents, crystallization nucleating agents, pigments, fillers, flame retardants, rubber modifiers, colorants, antioxidants and antistatic agents, less than 2000 parts per million of water, and less than one weight percent of crosslinked reaction products of the polyester resin carrier and the branching compound.

17. The concentrate of claim 16 wherein the composition consists essentially of the polyester resin carrier, the branching compound, noncrosslinked reaction products of the polyester resin carrier and the branching compound, less than 1000 parts per million of water, and optionally one or more polyester additives selected from the group consisting of nucleating agents, stabilizers, plasticizers, expansion nucleating agents, crystallization nucleating agents, pigments, fillers, flame retardants, rubber modifiers, colorants, antioxidants and antistatic agents.

18. The concentrate of claim 16 wherein the polyester resin carrier consists essentially of polyalkylene terephthalates and the polyfunctional branching compound consists essentially of pyromellitic dianhydride.

19. The concentrate of claim 17 wherein the polyester resin consists essentially of polyethylene terephthalate and the polyfunctional branching compound consists essentially of pyromellitic dianhydride.

20. A concentrate for use in the melt processing of a thermoplastic polyester, said concentrate prepared by melt processing a mixture of a branching agent amount of at least five weight percent of the mixture and a polyester carrier amount of at least fifty weight percent of the mixture, said concentrate characterized by a maximum melt-mixing torque no greater than ten percent of the highest maximum melt-mixing torque exhibited by melt processed mixtures containing a greater polyester carrier amount and a lower branching agent amount.

21. The concentrate of claim 20 wherein the polyester resin carrier comprises polyethylene terephthalate and the polyfunctional branching compound comprises pyromellitic dianhydride.

\* \* \* \* \*